US012398021B2

(12) United States Patent
Zhou et al.

(10) Patent No.: US 12,398,021 B2
(45) Date of Patent: Aug. 26, 2025

(54) PASSENGER TRANSPORT SYSTEM WITH A DISINFECTING DEVICE

(71) Applicant: INVENTIO AG, Hergiswil (CH)

(72) Inventors: Jackie Zhou, Shanghai (CN); Summer Zheng, Shanghai (CN); Cui Yao, Shanghai (CN); Georg Wagenleitner, Roßleithen (AT)

(73) Assignee: Inventio AG, Hergiswil (CH)

(*) Notice: Subject to any disclaimer, the term of this patent is extended or adjusted under 35 U.S.C. 154(b) by 85 days.

(21) Appl. No.: 18/566,568

(22) PCT Filed: Jun. 1, 2022

(86) PCT No.: PCT/EP2022/064860
§ 371 (c)(1),
(2) Date: Dec. 1, 2023

(87) PCT Pub. No.: WO2022/253876
PCT Pub. Date: Dec. 8, 2022

(65) Prior Publication Data

US 2024/0359951 A1 Oct. 31, 2024

(30) Foreign Application Priority Data

Jun. 4, 2021 (EP) .................................... 21177663

(51) Int. Cl.
*B66B 31/02* (2006.01)
*B66B 31/00* (2006.01)

(52) U.S. Cl.
CPC ............ *B66B 31/02* (2013.01); *B66B 31/003* (2013.01)

(58) Field of Classification Search
CPC .............................. B66B 31/02; B66B 31/003
(Continued)

(56) References Cited

U.S. PATENT DOCUMENTS 7,134,539 B2 * 11/2006 Kim ........................ B66B 31/02 198/324
7,347,314 B2 * 3/2008 Lombard ................ B66B 31/02 198/493
(Continued)

FOREIGN PATENT DOCUMENTS

CN 106 608 587 5/2017
CN 212076127 U 12/2020
(Continued)

OTHER PUBLICATIONS

International Search Report for International Application No. PCT/EP2022/064860 dated Jul. 29, 2022.

*Primary Examiner* — Mark A Deuble
(74) *Attorney, Agent, or Firm* — Knobbe, Martens, Olson & Bear, LLP

(57) ABSTRACT

The disclosure relates to a disinfecting device for disinfecting a movable surface of a passenger transport system. The disinfecting device has a housing with an interior and at least one radiation source arranged in the interior. The radiation source can emit germicidal electromagnetic radiation. The disinfecting device also has a device, arranged in the interior of the housing, and a radiation measurement sensor. The device is arranged between the radiation source and a radiation-transmissive side wall of the housing. The device allows sufficient detection by the radiation measurement sensor of a portion of the radiation emitted by the radiation source.

15 Claims, 5 Drawing Sheets

(58) Field of Classification Search
USPC .......................................... 198/335–338, 494
See application file for complete search history.

(56) References Cited

U.S. PATENT DOCUMENTS

| | | | | |
|---|---|---|---|---|
| 9,034,270 | B2 * | 5/2015 | Kobayashi .............. | B66B 31/02<br>422/186.21 |
| 11,305,028 | B2 * | 4/2022 | Kim .......................... | A61L 2/04 |
| 12,133,925 | B2 * | 11/2024 | Kim .......................... | A61L 2/26 |
| 2011/0158862 | A1 * | 6/2011 | Kim ........................ | B66B 31/02<br>422/292 |
| 2015/0028228 | A1 * | 1/2015 | Almasy ..................... | A61L 2/10<br>250/492.1 |
| 2023/0241275 | A1 * | 8/2023 | Yang ......................... | A61L 9/22<br>250/435 |
| 2023/0271811 | A1 * | 8/2023 | Häberle .................... | A61L 2/10<br>198/322 |
| 2024/0367945 | A1 * | 11/2024 | Kim .......................... | B08B 1/34 |

FOREIGN PATENT DOCUMENTS

| | | |
|---|---|---|
| CN | 212475750 U | 2/2021 |
| JP | 2006 193319 | 7/2006 |
| WO | WO 2021190915 A1 | 9/2021 |

* cited by examiner

PASSENGER TRANSPORT SYSTEM WITH A DISINFECTING DEVICE

TECHNICAL FIELD

The present disclosure relates to a passenger transport system which is designed as an escalator or moving walkway and has a disinfecting device.

SUMMARY

Passenger transport systems are used to transport people within buildings or structures. Germs in the form of viruses, bacteria, spores, and/or microbes can accumulate on surfaces of a passenger transport system. In order to be able to avoid the transmission thereof to users of the passenger transport system, a disinfecting device can be provided in the passenger transport system. The disinfecting device can be set up to disinfect movable surfaces of the passenger transport system—for example, by killing and/or removing germs located there.

One possible embodiment of a disinfecting device uses light sources such as light-emitting diodes (LED's), which emit germicidal electromagnetic radiation. For example, so-called UVC light-emitting diodes can be used for this purpose, which emit high-energy ultraviolet radiation, which is also referred to as UVC radiation and typically has a wavelength range of 100-300 nm-usually 180-280 nm.

The earlier patent application PCT/EP2021/055915, filed at an earlier date by the applicant of the present patent application, describes a passenger transport system in the form of an escalator or a moving walkway which is equipped with a disinfecting device. The disinfecting device uses UVC light-emitting diodes to irradiate and thus disinfect a handrail from different directions.

CN 106 608 587 A discloses a passenger transport system with a disinfecting device and sensors integrated into the handrail. A control device of the passenger transport system is connected to the sensor and the disinfecting device via a communications module. As soon as the sensor detects that a user is gripping one of the handrails, the passenger transport system and the disinfecting device are put into operation, in the sense of an automatic start/stop system. As soon as the user releases the handrail, the speed of the escalator is reduced-possibly to a standstill. The disadvantage of the proposed solution is that, in the event of a failure of the disinfecting device, the user must grasp a handrail covered with germs in order to put the escalator into operation or keep it in operation.

JP 2006 193319 A also discloses a disinfection device with UVC light-emitting diodes, wherein hot air is additionally blown onto the handrail by a hot air blower. The hot air is intended to dry the surface of the handrail in order to additionally reduce the chances of survival of the germs.

The object of the present disclosure is therefore to ensure that the disinfection device reliably disinfects movable surfaces on the passenger transport system and comes up with a design that requires low installation and maintenance outlay and thus low costs.

This object is achieved by a disinfecting device for disinfecting a movable surface of a passenger transport system with the features of claim 1. The disinfecting device has a housing with an interior and at least one radiation source arranged in the interior, wherein the radiation source can emit germicidal electromagnetic radiation. In order for the germicidal electromagnetic radiation to be able to penetrate from the interior and disinfect a movable surface of a passenger transport system, a side wall, facing the radiation source, of the housing is designed to be transmissive to radiation. The disinfecting device also has a device, arranged in the interior of the housing, and at least one radiation measurement sensor. The device is arranged between the at least one radiation source and the radiation-transmissive side wall and allows sufficient detection of a portion of the radiation emitted by the at least one radiation source by the radiation measurement sensor. By detecting a portion of the radiation emitted by the radiation source, on the one hand, the functionality of the disinfecting device can be checked. On the other hand, however, the radiation intensity can also be detected and readjusted if necessary, since the radiation sources, such as UVC fluorescent tubes or UVC light-emitting diodes, are subject to an aging process, and their radiation capability decreases over time while the energy supply remains constant.

A further advantage of this arrangement is also that the at least one radiation source, the device, and the at least one radiation measurement sensor are hermetically enclosed in the interior of the housing and are therefore protected from environmental influences such as moisture and dirt. Furthermore, this proposed "all-in-one solution" results in minimal installation effort, because, with the aid of the device, the radiation measurement sensor is already ideally arranged and aligned to the radiation sources inside the housing, and there is no need to find a suitable mounting location for the radiation measurement sensor inside the passenger transport system when installing the disinfection device. A replacement or exchange of a damaged or otherwise no longer functioning arrangement is also simplified in this way.

In one embodiment of the disclosure, a plurality of radiation sources can be arranged on a printed circuit board in a planar distribution. This printed circuit board can be arranged parallel to the radiation-transmissive side wall and opposite thereto in the interior of the housing. Of course, the circuit board can also form a side wall, arranged opposite the radiation-transmissive side wall, of the housing, wherein the radiation sources arranged on the circuit board are situated in the interior.

As already mentioned above, a device is also arranged in the interior, which allows sufficient detection by the radiation measurement sensor of a portion of the radiation emitted by the at least one radiation source. The device can have various designs here.

In one of these embodiments, the device can have a projection, arranged on the circuit board, that extends towards the radiation-transmissive side wall. The at least one radiation measurement sensor is arranged on this projection in such a way that it has an elevated position relative to the radiation sources, as a result of which a portion of the radiation emitted by these radiation sources can be directly detected by the radiation measurement sensor. The device may further include other parts such as cable connections, wireless transmitters, fasteners connecting the protrusion to the radiation measurement sensor, fasteners connecting the protrusion to the housing or circuit board described above, and the like.

In a further embodiment, at least one radiation measurement sensor is arranged on the circuit board. The device includes a reflective zone located in the region of the radiation-transmissive side wall. The reflective zone is arranged relative to the radiation measurement sensor and the radiation sources such that a portion of the radiation emitted by the at least one radiation source can be deflected onto the radiation measurement sensor.

In a further embodiment, the circuit board has at least one through-opening. In addition, a radiation measuring sensor is arranged in the interior space in a plane that is spaced apart from the circuit board and that is at a greater distance from the radiation-transmissive side wall than the circuit board. As part of the device, a reflective zone is also arranged in the region of the radiation-transmissive side wall in such a way that a portion of the radiation emitted by the at least one radiation source can be deflected through the through-opening onto the radiation measurement sensor. As a result, due to the modified beam path, a reflective zone with a larger area can be detected by the radiation measurement sensor.

The embodiments of the device described above can be realized individually in the interior, i.e., only one of these variant embodiments is present in the interior. However, it is also possible for two of these variant embodiments to be realized in the same interior. If, for example, a radiation measurement sensor is arranged on a projection and is irradiated directly, and a further radiation measurement sensor is arranged on the circuit board and is indirectly irradiated by radiation deflected in the reflecting zone, the sensor signals of these two radiation measurement sensors can be compared with one another and evaluated. For example, a similar decrease in both sensor signals would indicate weaker emitting radiation sources. For example, if the radiation measurement sensor located on the protrusion continuously detects the same amount of radiation, but the radiation measurement sensor located on the board detects increasing radiation, this may indicate that the radiation-transmissive side wall is increasingly covered with reflective dirt. Further evaluations are possible here, such as the complete failure of a radiation measurement sensor and the like.

The reflective zone can also be designed differently. In a first variant, the device has a sticker which adheres to the surface, facing the interior, of the radiation-transmissive side wall and has a radiation-reflecting coating as a reflective zone.

In a second variant, the device can have a coating or treatment applied to the surface, facing the interior, of the radiation-transmissive side wall, the coating or treatment having a radiation-reflecting property.

Further, the reflective zone can be designed to be partially reflective such that a portion of the emitted radiation is reflected, and the remainder of the emitted radiation passes through the device in the reflective zone.

Depending upon the design of the reflective properties, the reflective zone may only partially span the radiation-transmissive side wall. In this case, the regions not spanned allow the electromagnetic germicidal radiation emitted by the radiation sources to penetrate nearly unhindered through the radiation-transmissive side wall.

In a further embodiment, the device can have a converging lens which is arranged on the circuit board and is raised relative to the radiation-transmissive side wall. Here, the radiation from the radiation source reflected from inner walls of the housing is focused in a focal point or a focal line of the converging lens and directed onto a radiation measurement sensor.

So that the disinfecting device can be maintained more easily, the radiation-transmissive side wall can be designed as a cover part that can be detached from the rest of the housing. As a result, the interior of the housing is freely accessible when the cover part is removed.

In order to be able to uniformly irradiate a movable surface, which is a curved surface in the example of a handrail, the disinfection device can have two panels of mirror-symmetrical design, which are attached to two opposite sides of the housing in such a way that the radiation-transmissive side wall is arranged between the panels, which project laterally towards it. Here, each panel has a sheet-metal part formed by folding, wherein one end of the formed sheet-metal part is fixed to the housing, and the other end of the formed sheet-metal part extends in each case towards the sheet-metal part arranged opposite on the housing. In order to minimize scattering losses, the inner sides, facing one another and the radiation-transmissive side wall, of the two shaped sheet-metal parts are designed as mirror surfaces. Thus, the two panels form with the housing a tunnel, so to speak, through which the movable surface to be disinfected, e.g., that of the handrail described above, is guided.

The disinfecting device described above is designed in particular for use in passenger transport systems which are designed as an escalator or moving walkway. Such a passenger transport system has at least one balustrade, having at least one circulating handrail. This handrail has the movable surface to be disinfected, since it travels along with the conveyor belt and is grasped by hand by users of the transport system during travel. Correspondingly, the passenger transport system has at least one handrail disinfecting device for each circulating handrail.

Since in most cases the balustrade has a balustrade base in which a return run of the handrail is concealed from the users of the passenger transport system, it is advantageous that the disinfecting device is installed in the base of the balustrade. On the one hand, this preserves the aesthetics of the balustrade and, on the other, protects the user from germicidal electromagnetic radiation, which cannot penetrate the usually opaque cladding sheets of the balustrade base.

In order to be able to transport users of the transport system, the system also has a conveyor belt arranged in a circulating manner, the forward run of which can be entered onto by users, and the return run of which is hidden from the users and arranged inside the passenger conveyor system. Of course, the conveyor belt is also a movable surface, which can be disinfected if necessary. Thus, the passenger transport system can also have at least one disinfecting device for the conveyor belt. However, it may be that no panels are necessary here.

It should be noted that some of the possible features and advantages of the disclosure are described herein with reference to different embodiments of a passenger transport device. A person skilled in the art will recognize that the features can be suitably combined, adapted, or exchanged in order to arrive at further embodiments of the disclosure.

BRIEF DESCRIPTION OF THE DRAWINGS

Embodiments of the disclosure will be described below with reference to the accompanying drawings, wherein neither the drawings nor the description are intended to be interpreted as limiting the disclosure. Furthermore, the same reference signs are used for elements that are identical or have the same effect. In the drawings.

DETAILED DESCRIPTION

Figure 1:
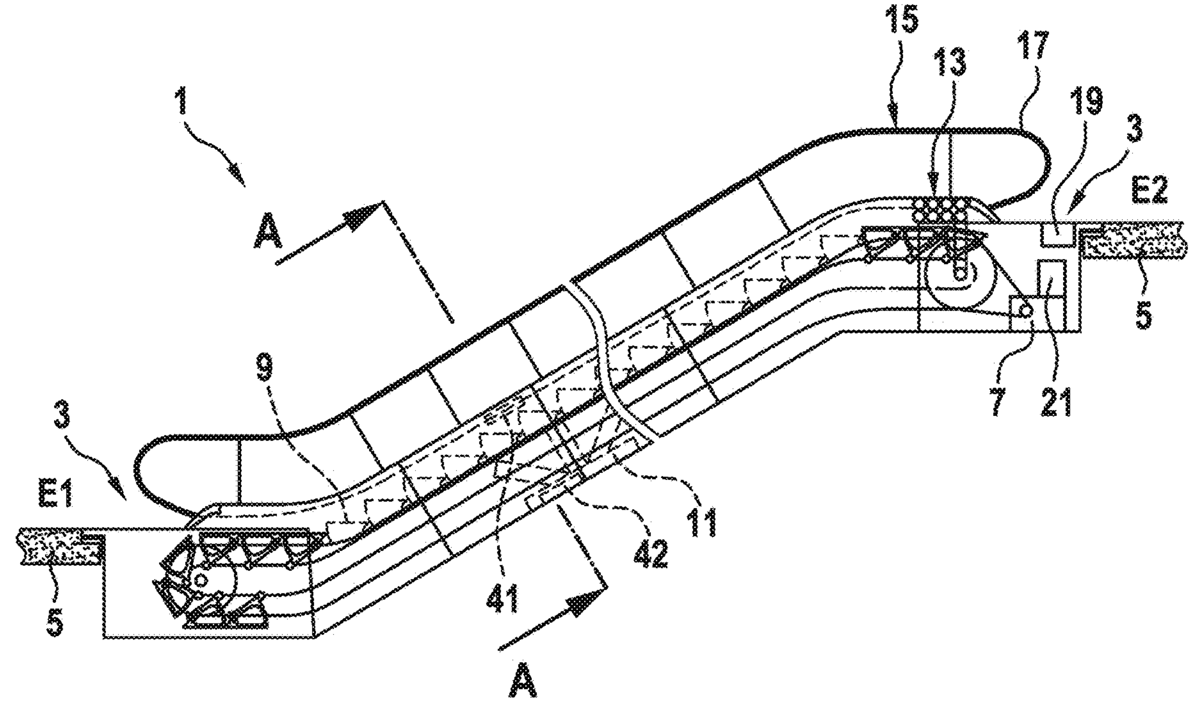
FIG. 1: shows a simplified view of a passenger transport system designed as an escalator having a disinfecting device.

FIG. 1 shows a simplified view of a passenger transport system 1 having a supporting structure 11 designed as a framework. The passenger transport system 1 designed as an escalator connects a lower level E1 with an upper level E2 of a building 5. The passenger transport installation 1 can be entered and exited again via access regions 3. A circulating conveyor belt 9 is arranged in the supporting structure 11, which belt is deflected in the upper level E2 and in the lower level E1, and thus has a leading portion and a returning portion. For the sake of a better overview, the detailed representation of the returning portion, as well as a detailed representation of frames, guide rails, and rail blocks, has been omitted.

The passenger transport system 1 also has two balustrades 15 that extend along each longitudinal side of the conveyor belt 9, wherein only the balustrade 15 arranged in the foreground in the viewing plane is visible in FIG. 1. A handrail 17 is arranged in a circulating manner on each balustrade 15, the return run of which handrail is guided in a balustrade base 13. This balustrade base 13 connects the balustrade 15 to the supporting structure 11. In other words, the return run of the handrail 17 is concealed from the users of the passenger transport system 1 and is guided back in the balustrade base 13. The conveyor belt 9 and the handrails 17 are driven by a motor 21, which for this purpose is operatively connected to them via a reduction gear 7. The motor 21 is controlled by a controller 19.

Furthermore, the passenger transport system 1 has at least one disinfecting device 41 for each circulating handrail 17. Said device is also installed in the balustrade base 13 of the balustrade 15 and is thus concealed from the users of the passenger transport system 1. A disinfecting device 42 can also be provided for the conveyor belt 9, which can in principle be the same in its construction as a disinfecting device 41 for a handrail. Logically, this has to be larger, since the conveyor belt 9 is substantially wider than a handrail 17.

Figure 2:
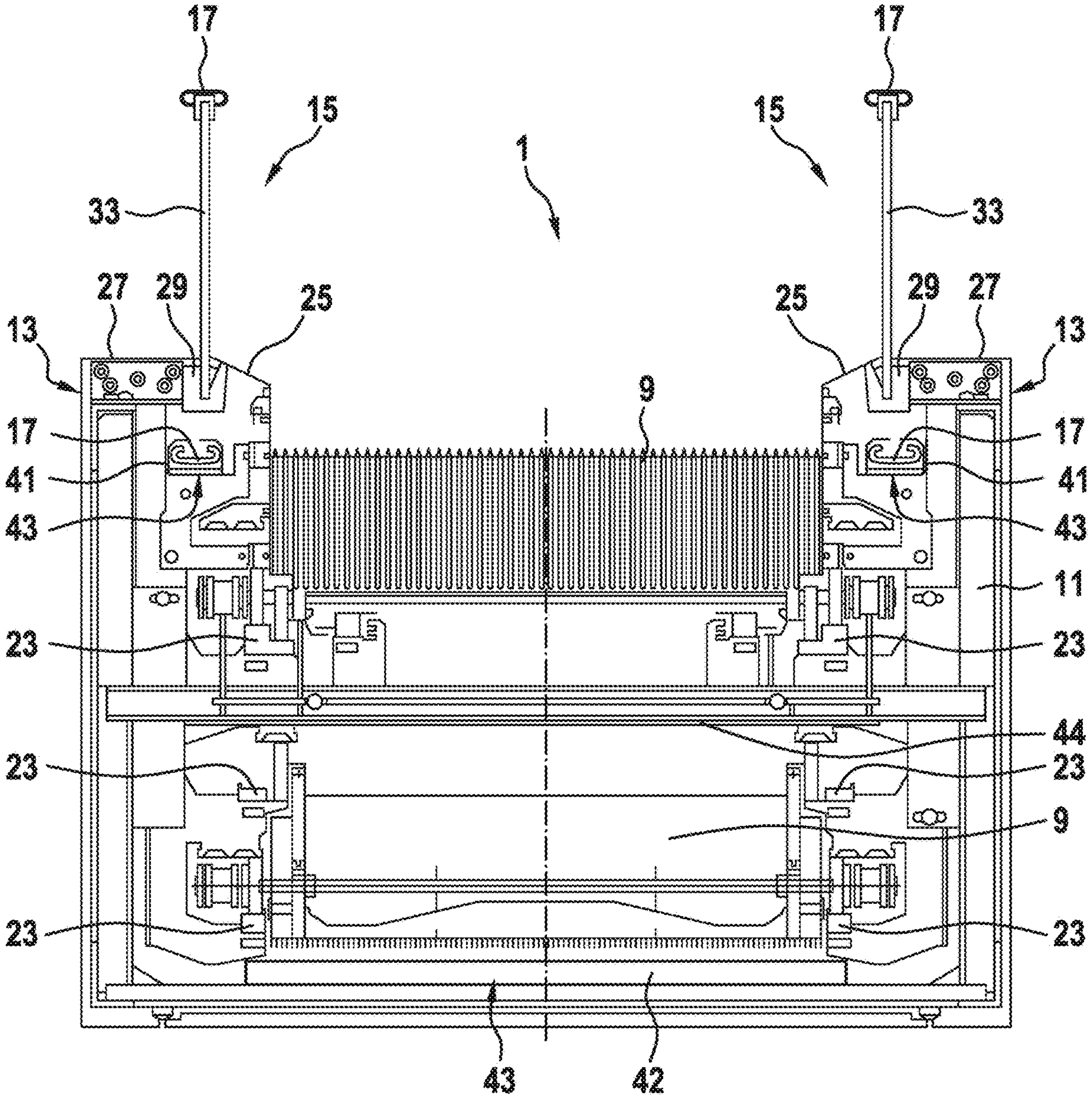
FIG. 2: shows a cross-section along the line A-A through the passenger transport system of FIG. 1.

FIG. 2 shows a cross-section through the passenger transport system 1 according to FIG. 1 along the line A-A. In this cross-section, both the leading and the returning portions of the conveyor belt 9 can be seen. The conveyor belt 9 is guided on guide rails 23 within the supporting structure 11. A balustrade 15 and a balustrade base 13 are arranged to the left and right of the leading portion of the conveyor belt 9, which portion is arranged at the top when the passenger transport system 1 is installed as intended. Within the balustrade base 13, and concealed by cladding panels 25, 27, clamping devices 29 are provided which serve as clamping receptacles for the individual balustrade panels 33. In this case, the balustrade panel 33 is clamped in a stationary manner at its lower end in at least one of the clamping devices 29. The clamping devices 29 are arranged along the longitudinal extension of the passenger transport system 1 within the balustrade base 13 on the supporting structure 11. Below the clamping devices 29, a disinfecting device 41 is provided for each handrail 17 arranged in a circulating manner on the balustrade 15, which disinfecting devices are equipped with radiation sources 43 that can emit germicidal electromagnetic radiation in the region of their light cone.

Because the return run of the handrail 17 is also guided in the balustrade base 13, it is advantageous to arrange the disinfecting device 41 in the balustrade base 13 and to guide the return run through or over said disinfecting device 41 there. It can thereby be ensured that no harmful electromagnetic radiation can reach the users of the passenger transport installation 1 under any circumstances. The same considerations also apply to a disinfecting device 42 which is intended to disinfect the conveyor belt 9. Its arrangement is preferably provided below the returning section of the conveyor belt 9, so that the surfaces that come into contact with users can be irradiated sufficiently. Furthermore, a panel 44 can be arranged between the advancing and return sections so that the germicidal radiation cannot penetrate through gaps and crevices of the conveyor belt 9 to the users.

Figure 3:
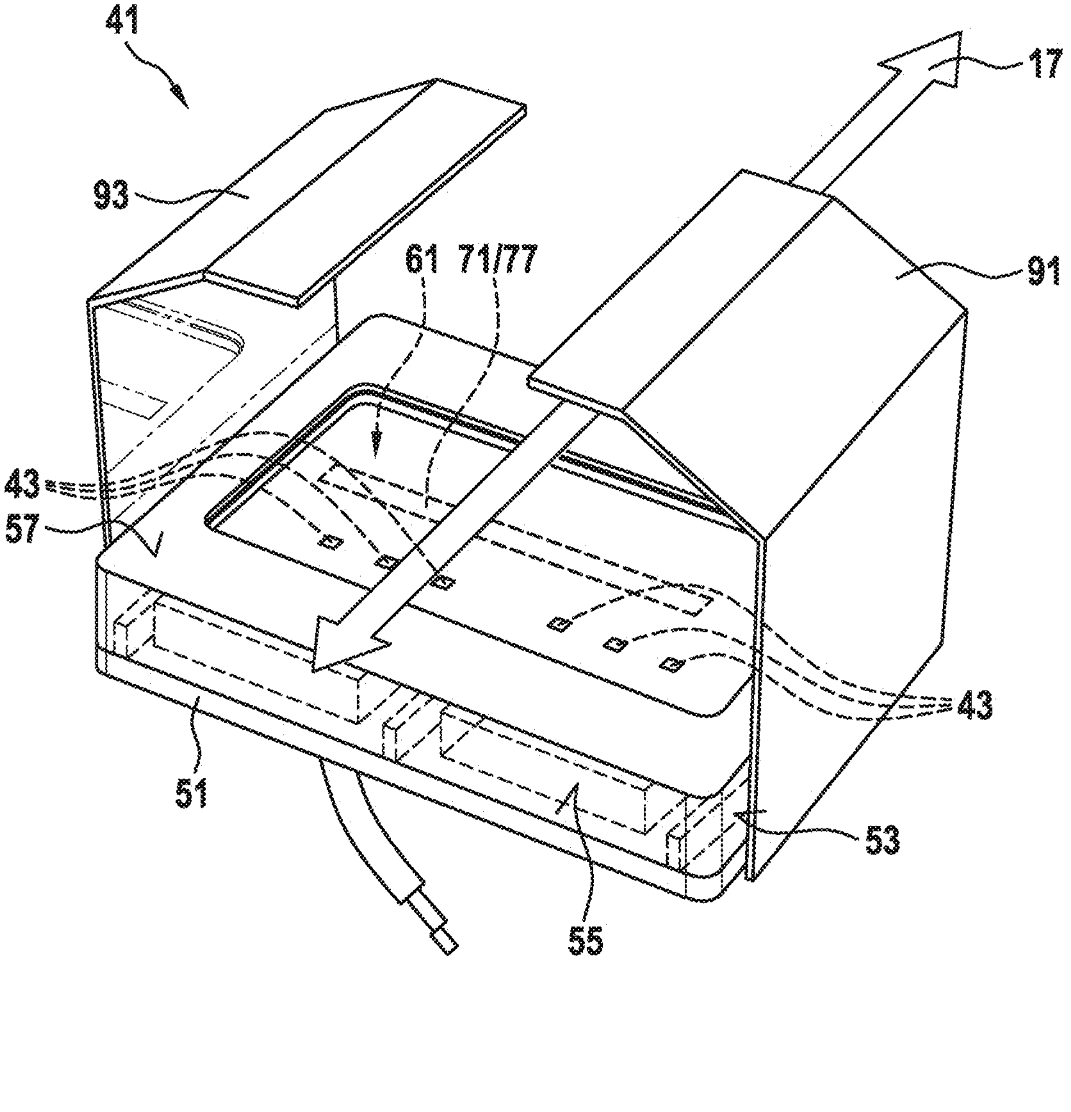
FIG. 3: shows a three-dimensional view of the disinfecting device shown in FIGS. 1 and 2 with a guided-through portion of a handrail of the passenger transport system shown symbolically by a double arrow.
Figure 4:
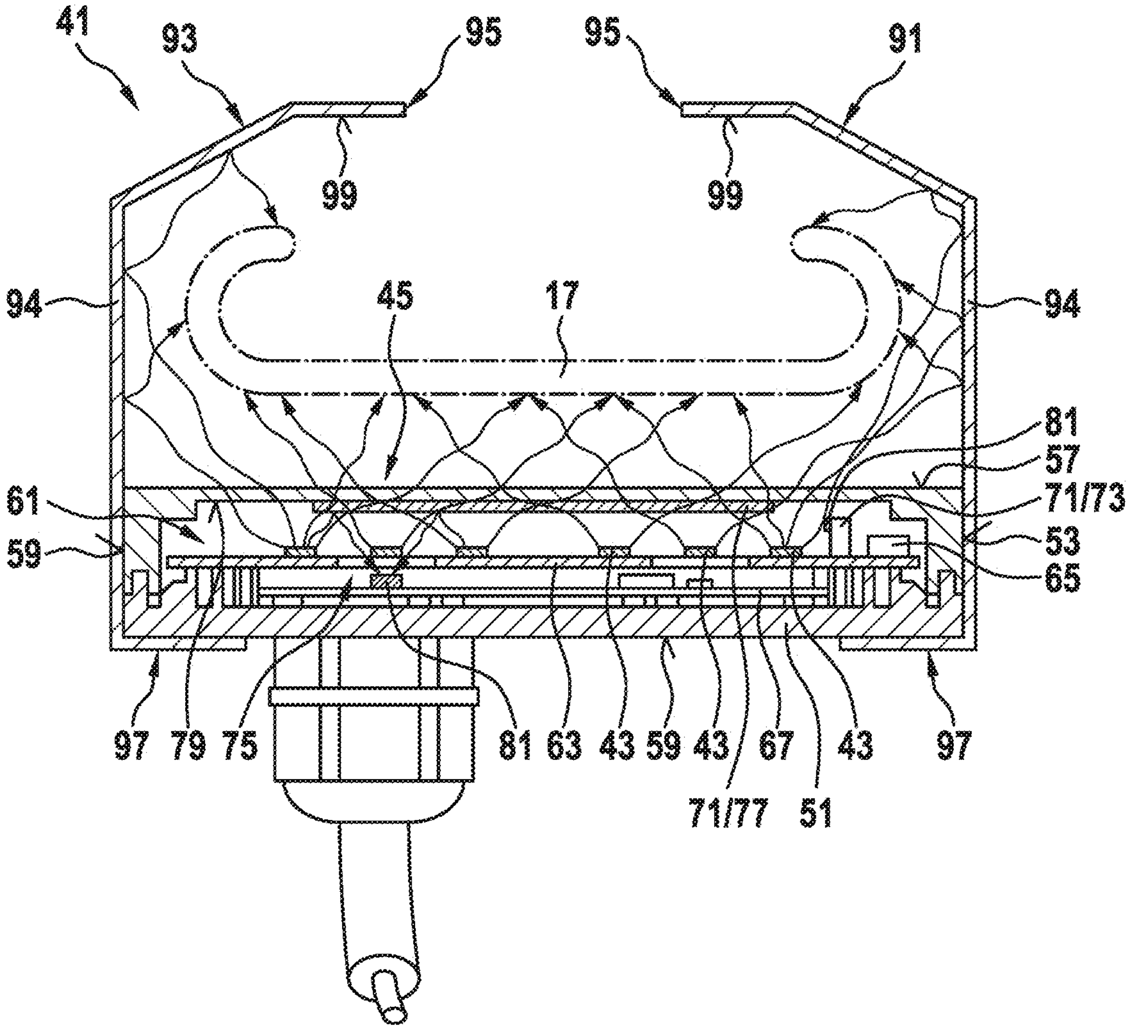
FIG. 4: shows a cross-section of the disinfecting device shown in FIG. 3, with possible variant embodiments of a device that enables the measurement of emitted radiation.
Figure 5:
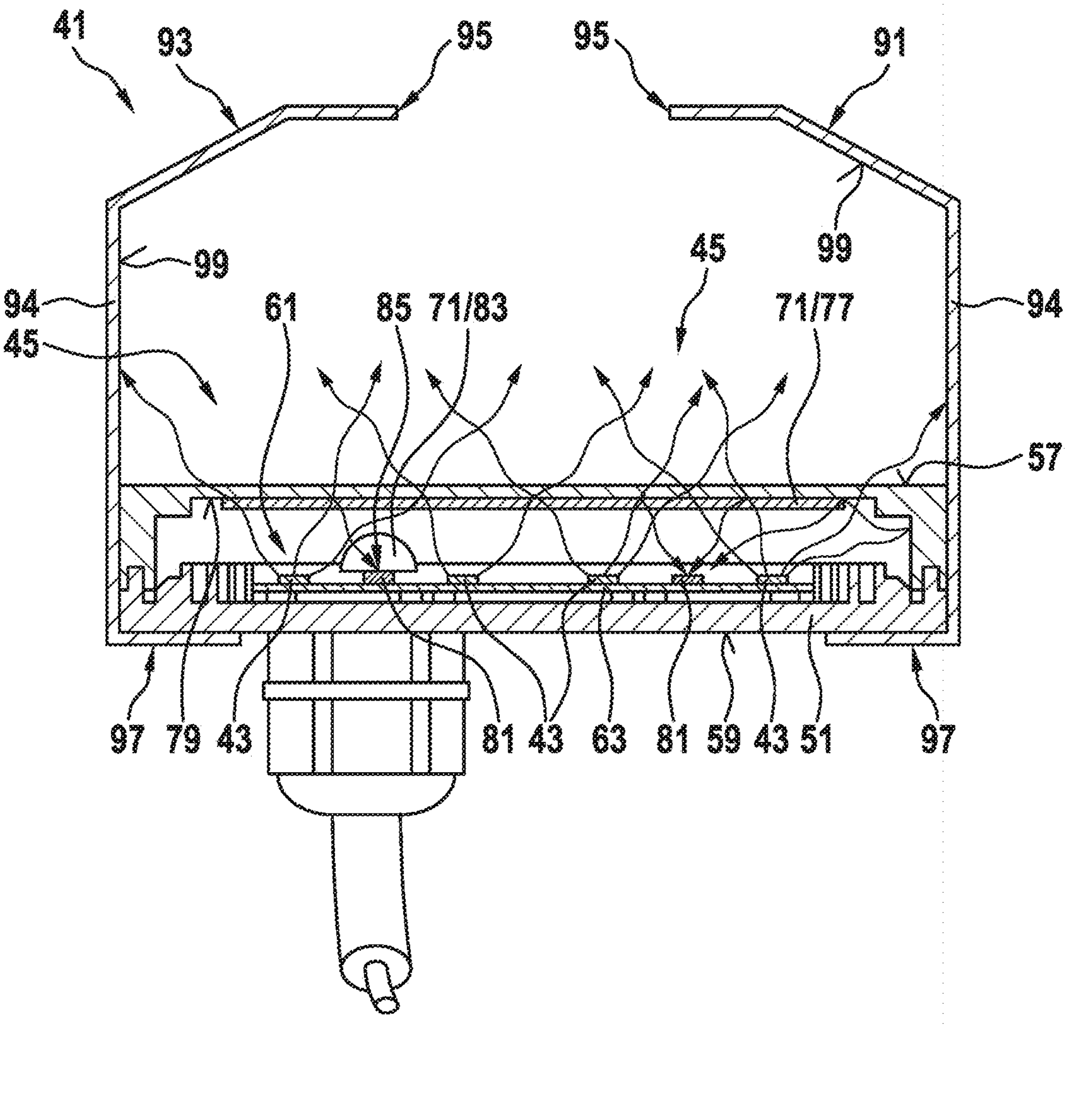
FIG. 5: shows a cross-section of the disinfecting device shown in FIG. 3, with further possible variant embodiments of a device which enables the measurement of emitted radiation.

FIGS. 3 through 5 all show the same disinfecting device 41 already shown in FIGS. 1 and 2 and provided for the handrail 17, or at least parts thereof. FIGS. 3 through 5 are thus described together in the following. To allow more details to be shown in FIG. 3, the handrail 17 of the passenger transport system 1 is shown symbolically by a double arrow. FIG. 4 shows a cross-section of the disinfecting device 41 shown in FIG. 3, with possible variant embodiments of a device which enables the measurement of emitted radiation. FIG. 5 also shows a cross-section of the disinfecting device 45 shown in FIG. 3, with further variant embodiments of a device which enables the measurement of emitted radiation. In FIGS. 4 and 5, for the purpose of simplifying the present document and for illustrating possible combinations, two possible variant embodiments of the device are shown in each case, wherein, in each case, only one of these variant embodiments can be implemented in a disinfecting device 41.

The disinfecting device 41 shown in FIGS. 3 through 5 comprises a housing 51, the side walls 53, 55, 57, 59 of which enclose an interior 61. In the present exemplary embodiment, the side walls 53, 55, 57, 59 are designed as planar side walls 53, 55, 57, 59, so that the housing 51 has the shape of a flat, rectangular box. At least one of these side walls 53, 55, 57, 59 is designed as a radiation-transmissive side wall 57. A plurality of radiation sources 43 are arranged in the interior 61. In the present exemplary embodiments, the radiation sources 43 are shown as UVC light-emitting diodes, which can emit electromagnetic radiation with a wavelength of 100 to 300 nm, and preferably 220 to 280 nm. The UVC light-emitting diodes or radiation sources 43 are arranged in a planar distribution on a planar printed circuit board 63, on which further electronic components 65 required for operating and for controlling the radiation sources 43 can also be installed. Due to their design, the radiation sources 43 have a light cone 45, wherein said light-emitting diodes emit germicidal electromagnetic radiation in the region of their light cone 45. The light cones 45 are oriented towards the radiation-transmissive side wall 57. In other words, the radiation-transmissive side wall 57 faces the radiation-transmissive side wall 57, or the board 63 provided with the radiation sources 43 is situated opposite the radiation-transmissive side wall 57.

In order to make the interior 61 accessible and to facilitate the assembly and maintenance of the disinfecting device 41, the radiation-transmissive side wall 57 can be designed as a cover that can be detached from the rest of the housing 51.

The disinfecting device 41 also has a device 71, arranged in the interior 61 of the housing 51, and a radiation measurement sensor 81. In the present embodiment, only one radiation measurement sensor 81 is provided in the interior 61 of the housing 51. Of course, several radiation measurement sensors can also be provided if necessary. The device 71 is arranged between the at least one radiation source 43 and the radiation-transmissive side wall 57, and allows sufficient detection by the radiation measurement sensor 81 of a portion of the electromagnetic radiation emitted by the at least one radiation source 43. By detecting a portion of the radiation emitted by the radiation source 43, on the one hand, the functionality of the disinfecting device 41 can be checked. On the other hand, however, the radiation intensity can also be detected and readjusted if necessary, since radiation sources such as UVC fluorescent tubes or UVC light-emitting diodes are subject to an aging process, and their radiation capability decreases over time while the energy supply remains constant. The advantage of this arrangement is also that the at least one radiation source 43, the device 71, and the radiation measurement sensor 81 are hermetically enclosed in the interior 61 of the housing 51 and are therefore protected from environmental influences such as moisture and dirt.

In order to enable the detection by the radiation measurement sensor 81 arranged in the interior 61 of a portion of the radiation emitted by the radiation sources 43, various variant embodiments of the device 71 are proposed below.

In a first variant embodiment, which is shown in particular in FIG. 4, the device 71 has a projection 73, arranged on the printed circuit board 63, which projection extends towards the radiation-transmissive side wall 57. At least one radiation measurement sensor 81 is situated on this protrusion 73, such that the radiation measurement sensor 81 has a raised position relative to the radiation sources 43. In other words, the projection 73 is a base arranged on the printed circuit board 63, which base is raised over the UVC light-emitting diodes or radiation sources 43 and holds the radiation measurement sensor 81 in at least one of the light cones 45 emanating therefrom. Thus, due to the raised position of the radiation measurement sensor 81, a portion of the radiation emitted by the radiation sources 43 can be directly detected by the radiation measurement sensor 81.

In a further variant embodiment of the device, which is also shown in FIG. 4, the circuit board 63 has at least one through-opening 75. A radiation measurement sensor 81 is arranged in a plane, spaced apart from the board 63, of the interior 61, which plane is at a greater distance from the radiation-transmissive side wall 57 than the board 63. In addition, a reflective zone 77, belonging to the device 71, is also arranged in the region of the radiation-transmissive side wall 57 in such a way that a portion of the radiation emitted by the at least one radiation source 43 can be deflected through the through-opening 75 onto the radiation measurement sensor 81.

In a further variant embodiment of the device 71, shown in FIG. 5, a radiation measurement sensor 81 is arranged on the printed circuit board 63. The device 71 further comprises a reflective zone 77 arranged in the region of the radiation-transmissive side wall 57, the reflective zone 77 being arranged with respect to the radiation measurement sensor 81 and the radiation sources 43 such that a portion of radiation emitted by at least one of the radiation sources 43 is deflected onto the radiation measurement sensor 81. Preferably, however, the reflective zone 77 is arranged with an orientation such that a portion of radiation from each of the radiation sources 43 arranged in the interior is reflected onto the radiation measurement sensor 81. It may be that the spatial relations of the interior 61 are made tight enough that more than one radiation measurement sensor 81 is required for this purpose, and, as a result, the radiation sources 43 are monitored in groups.

In order to provide a reflective zone 77, the device 71 can have a sticker that adheres to the surface 79, facing the interior 61, of the radiation-transmissive side wall 57, and that has a radiation-reflecting coating as a reflective zone 77. In other words, a corresponding sticker is a surface element, the front side of which reflects the radiation and the rear side of which is designed to be self-adhesive in order to adhere to the surface 79. Another possibility is that the device 71 has a coating or treatment applied to the surface 79, facing the interior 61, of the radiation-transmissive side wall 57, the coating or treatment having a radiation-reflecting property. It is also possible for the reflective zone 77 to be designed to be partially reflective such that a portion of the emitted radiation is reflected, and the remainder of the emitted radiation passes through the device 71 in the reflective zone 77. As indicated in FIG. 3, the reflective zone 77 preferably spans the radiation transmissive side wall 57 only partially, so that most of the radiation emitted by the radiation sources 43 can pass through the radiation-transmissive side wall 57 unobstructed.

In a further variant embodiment of the device 71, which is also shown in FIG. 5, the device 71 has a converging lens 83. The converging lens 83 is arranged on the printed circuit board 63 and is raised relative to the radiation-transmissive side wall 57, wherein electromagnetic radiation of the radiation sources 43 reflected by inner walls of the housing 51, focused in a focal point 85 or in a focal line of the converging lens 83, is directed onto a radiation measurement sensor 81. Of course, in this embodiment as well, a reflective zone 77 can be present that is arranged or formed in the region of the radiation-transmissive side wall 57 and reflects a portion of radiation onto the converging lens 83.

For a handrail 17 to be sufficiently disinfected, all surfaces that can be touched by a user must be irradiated with electromagnetic radiation. In order to achieve this, the disinfecting device 41 can have two mirror-symmetrical panels 91, 93 as shown in FIGS. 3 through 5. The two panels 91, 93 are fastened to two opposite sides of the housing 51 such that the radiation-transmissive side wall 57 is arranged between the laterally-projecting panels 91, 93. Each panel 91, 93 has a sheet-metal part 94 formed by folding, wherein one end 97 of the formed sheet-metal part 94 is fixed to the housing 51, and the other end 95 of the formed sheet-metal part 94 extends in each case towards the sheet-metal part 94 arranged opposite on the housing 51. So that the electromagnetic radiation penetrating through the radiation-transmissive side wall 57 and impinging on the panels 91, 93 can be deflected to the surface of the handrail 17 to be disinfected as far as possible without scattering loss, the inner sides 99 of the two shaped sheet-metal parts 94 facing one another and facing the radiation-transmissive side wall 57 are formed as mirror surfaces. Since there are only surfaces to be disinfected on the conveyor belt 9 which can be sufficiently irradiated or disinfected from one direction of radiation, no panels 91, 93 are required in the disinfection device 42, which is shown by way of suggestion in FIGS. 1 and 2.

Although FIGS. 1 through 5 show different aspects of the present disclosure on the basis of a passenger transport system 1 designed as an escalator, which system is intended to connect floors E1, E2 which are vertically spaced apart from one another, it is obvious that the described disinfection devices 41, 42 can equally be used in the case of inclined moving walkways or horizontally-arranged moving walkways. As described, the reflective zone is preferably arranged on the inside of the radiation-transmissive side wall, and thus between the radiation source and the radiation-transmissive side wall. This protects the reflective zone from damage caused by environmental influences. However, it goes without saying that a reflecting zone arranged directly on the outside of the radiation-transmissive side wall is a functionally equivalent solution and is thus included in the scope of protection.

Finally, it should be noted that terms such as "having," "comprising," etc., do not preclude other elements or steps, and terms such as "a" or "one" do not preclude a plurality. Furthermore, it should be noted that features or steps which have been described with reference to one of the above embodiments may also be used in combination with other features or steps of other embodiments described above. Reference signs in the claims should not be considered to be limiting.

The invention claimed is:

1. A disinfecting device for disinfecting a movable surface of a passenger transport system, the disinfecting device comprising:

a housing with an interior;

at least one radiation source arranged in the interior, wherein the at least one radiation source emits germicidal electromagnetic radiation, wherein a side wall of the housing facing the radiation source is configured as a radiation-transmissive side wall; and a device in the interior of the housing; and at least one radiation measurement sensor, wherein the device is arranged between the at least one radiation source and the radiation-transmissive side wall, and wherein the device is configured such that it allows sufficient detection by the radiation measurement sensor of a portion of the radiation emitted by the at least one radiation source.

2. The disinfecting device of claim 1, wherein a plurality of radiation sources are arranged on a printed circuit board in a planar manner, wherein the printed circuit board is arranged parallel to the radiation-transmissive side wall and opposite thereto in the interior.

3. The disinfecting device of claim 2, wherein the device has a projection arranged on the printed circuit board, wherein projection extends towards the radiation-transmissive side wall, and wherein at least one radiation measurement sensor is arranged on this projection in such a way that the radiation measurement sensor has a raised position relative to the radiation sources, as a result of which a portion of the radiation emitted by these radiation sources can be detected directly by the radiation measurement sensor.

4. The disinfecting device of claim 2, wherein at least one radiation measurement sensor is arranged on the printed circuit board, and the device comprises a reflective zone arranged in the region of the radiation-transmissive side wall, which region is arranged in such a way relative to the radiation measurement sensor and to the radiation sources that a portion of the radiation emitted by the at least one radiation source can be deflected onto the radiation measurement sensor.

5. The disinfecting device of claim 2, wherein the circuit board has at least one through-opening and, in a plane spaced apart from the circuit board, which plane is at a greater distance from the radiation-transmissive side wall than the printed circuit board, a radiation measurement sensor is arranged, and, as part of the device, a reflective zone is arranged in the region of the radiation-transmissive side wall in such a way that a portion of the radiation emitted by the at least one radiation source can be deflected through the through-opening onto the radiation measurement sensor.

6. The disinfecting device of claim 4, wherein the device comprises a sticker which adheres to the surface, facing the interior, of the radiation-transmissive side wall and has a radiation-reflecting coating as a reflective zone.

7. The disinfecting device of claim 4, wherein the device comprises a coating or treatment applied to the surface, facing the interior, of the radiation-transmissive side wall, the coating or treatment having a radiation-reflecting property.

8. The disinfecting device of claim 4, wherein the reflective zone is designed to be partially reflective so that a portion of the emitted radiation is reflected, and the remainder of the emitted radiation passes through the device in the reflective zone.

9. The disinfecting device of claim 4, wherein the reflective zone only partially spans or covers the radiation-transmissive side wall.

10. The disinfecting device of claim 2, wherein the device has a converging lens which is arranged on the printed circuit board and is raised relative to the radiation-transmissive side wall, wherein radiation of the radiation sources reflected by inner walls of the housing, focused in a focal point or a focal line of the converging lens, is directed onto a radiation measurement sensor.

11. The disinfecting device of claim 1, wherein the radiation-transmissive side wall is designed as a cover part that can be detached from the rest of the housing.

12. The disinfecting device of claim 1, wherein the disinfecting has panels which are fastened as two mirror-symmetrically-formed panels to two opposite sides of the housing in such a way that the radiation-transmissive side wall is arranged between the laterally-projecting panels, wherein each panel comprises a sheet-metal part formed by folding, wherein one end of the shaped sheet-metal part is fixed to the housing, and the other end of the shaped sheet-metal part extends in each case towards the sheet-metal part arranged opposite on the housing, and wherein the inner sides, facing one another and the radiation-transmissive side wall, of the two, shaped sheet-metal parts are mirror surfaces.

13. A passenger transport system configured as an escalator or a moving walkway, comprising at least one balustrade that comprises at least one circulating handrail, wherein, for each circulating handrail, the passenger transport system comprises at least one disinfecting device according to one of claim 1.

14. The passenger transport system of claim 13, wherein the balustrade comprises a balustrade base in which a return run of the handrail is guided so as to be concealed from the users of the passenger transport system, and wherein the disinfecting device is installed in the balustrade base of the balustrade.

15. The passenger transport system according to claim 13, wherein further comprising a circulating conveyor belt, whose leading run can be entered onto by users and whose returning run is arranged hidden from the users in the interior of the passenger transport system, and wherein the passenger transport system further comprises at least one disinfecting device according to one of claim 1 for the conveyor belt.

* * * * *